United States Patent [19]

Rinne

[11] Patent Number: 5,946,326
[45] Date of Patent: Aug. 31, 1999

[54] METHOD AND AN EQUIPMENT FOR TRANSMITTING A FILE-BASED MULTIMEDIA AND HYPERMEDIA SERVICE TO A MOBILE RECEIVER

[75] Inventor: Mika Rinne, Espoo, Finland

[73] Assignee: Nokia Telecommunications Oy, Espoo, Finland

[21] Appl. No.: 08/782,926

[22] PCT Filed: May 3, 1996

[86] PCT No.: PCT/FI96/00247

§ 371 Date: Jan. 13, 1997

§ 102(e) Date: Jan. 13, 1997

[87] PCT Pub. No.: WO96/36141

PCT Pub. Date: Nov. 14, 1996

[30] Foreign Application Priority Data

May 11, 1995 [FI] Finland ..................................... 952298

[51] Int. Cl.$^6$ .................................................. H04J 11/00
[52] U.S. Cl. ........................ 370/486; 370/522; 370/538; 370/208; 348/385; 348/7
[58] Field of Search .................................. 370/465, 468, 370/522, 486, 487, 537, 493, 496, 473, 474, 203, 208, 538; 348/7, 12, 13, 331, 385, 387

[56] References Cited

U.S. PATENT DOCUMENTS

| | | | |
|---|---|---|---|
| 4,713,758 | 12/1987 | De Kelaita | 364/200 |
| 5,124,943 | 6/1992 | Lubarsky | 395/200 |
| 5,359,601 | 10/1994 | Wasilewski et al. | |
| 5,400,401 | 3/1995 | Wasilewski et al. | |
| 5,446,888 | 8/1995 | Pyne | 395/600 |
| 5,452,288 | 9/1995 | Rahuel et al. | |
| 5,799,192 | 8/1998 | Yasuda | 309/705 |

FOREIGN PATENT DOCUMENTS 43 19 217  2/1995  Germany .

OTHER PUBLICATIONS

Kimmo Hakkarainen, "A Channel Encoder/Decoder for DAB Demonstrator", Mar. 1995, pp. I–51.

Primary Examiner—Chau Nguyen
Assistant Examiner—Thinh Vu
Attorney, Agent, or Firm—IP Group of Pillsbury Madison & Sutro LLP

[57] ABSTRACT

An apparatus and a method for transferring an audio/video/data service from a transmission end to a reception end over a radio interface. The audio/video/data service includes one of audio information, video information and data. The radio interface includes a plurality of subchannels and a plurality of carriers for transmitting the audio/video/data service and at least one information channel. The audio/video/data service is divided into a set of files, wherein the set of files forms a service ensemble. A parameter group is associated with and describes each corresponding one of the files. Each of the files, along with a corresponding parameter group is placed onto one of the subchannels. A placement indicator and a corresponding parameter group is placed on the at least one information channel. The subchannels and the at least one information channel are multiplexed into a plurality of transmission frames which are digitally modulated for transmission to the reception end over the radio interface using the plurality of carriers. The reception end receives the plurality of carriers and demodulates, from the carriers, the transmission frames, separating the subchannels and the at least one information channel. Information received from the at least one information channel is used for separating the parameter groups from the subchannels. The parameter groups are used for forming a selective service by combining and processing substantially only desired files.

12 Claims, 4 Drawing Sheets

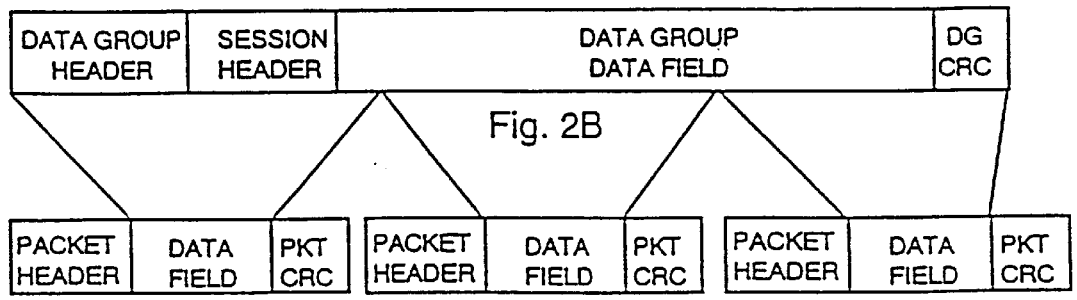
Fig. 2A
Fig. 2B
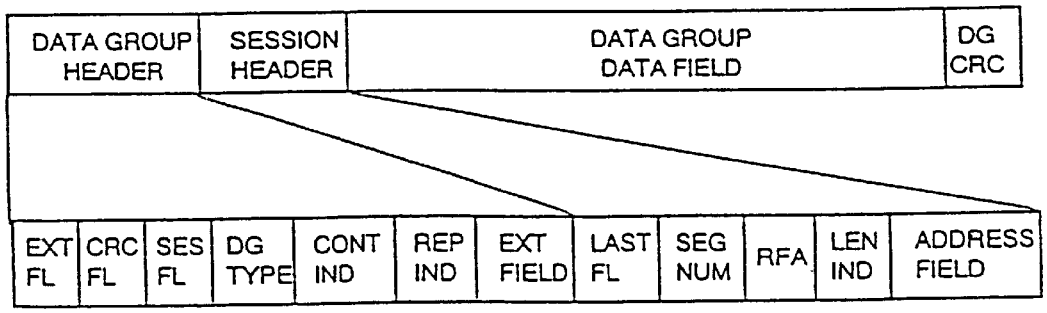
Fig. 3

METHOD AND AN EQUIPMENT FOR TRANSMITTING A FILE-BASED MULTIMEDIA AND HYPERMEDIA SERVICE TO A MOBILE RECEIVER

BACKGROUND OF THE INVENTION

1. Field of the Invention

The present invention relates to data transmission utilizing a digital transmission channel that enables the transmission of audio and data services and the selective reception of these services. The information transmitted on the transmission channel can either be in a continuous data stream or packet form.

2. Description of the Related Art

In the digital audio system DAB (Digital Audio Broadcasting), developed for using frequency bands efficiently, the transmission path is completely digital and the system is intended to replace the present generally used analog broadcast system using frequency modulation. The DAB is especially designed for a mobile environment, that is, the receiver can be mobile so that different attenuations and disturbances produced by the propagation of a radio signal can be prevented by the combined effect of suitable modulation and channel coding. A DAB receiver is capable of enduring several echoes originating from the same source and thus a country-wide radio coverage can be achieved with one frequency channel since the signal of stations other than the one to be listened to is interpreted as an echo and will be eliminated.

The DAB determines the digital radio channel, based on many carriers, that is suitable for the. transmission of both audio and data services. A completely digital transmission channel may be either a continuous data stream or packet channel. Packet switching is more flexible and more easily enables the transmission of data units of a finite length. The transmission, transfer and reception of the DAB system is explained in detail in Kimmo Hakkarainen, MSc Thesis, A Channel Encoder/Decoder for DAB Demonstrator, 1995, Tampere University of Technology, pages 2 to 13. For the receiver the highest abstraction level of the DAB system is called an ensemble. One ensemble is divided into several services and each service is further divided into service components. A service component is either an audio channel or a data channel.

FIG. 1 discloses one DAB system in a simplified way. At the transmission end a control device 1 controls the transmission. A FIC and control block 2 produces SI (Service Information) information relating to audio and data services, Multiplex Configuration Information MCI and CA (Conditional Access) information relating to conditional access that can be information relating to chargeability/encryption of the services. Taken together, they form a fast information channel FIC. Audio information, such as music, supplied by producers 3 of audio services is compressed in a MPEG encoder 4 and is led to audio channel encoders 5. Similarly, the data supplied by producers 6 of data services is encoded in data channel encoders 7. The channel encoded data, audio and FIC information are led to a block carrying out orthogonal frequency division multiplexing OFDM. The OFDM symbol produced by an inverse fast Fourier transformation of the block is a group of subcarriers with an exactly determined duration. Individual subcarriers are modulated by a D-QPSK (Differential Quaternary Phase Shift Keying) method and at the end it results in a DAB transmission signal that comprises successive transmission frames. Each frame is time multiplexed between a synchronization channel, a fast information channel FIC and a channel MSC (Main Service Channel) containing audio and data services. Transmission mode I intended for a radio network on the ground using one frequency has 1,536 carriers, a frame has 76 symbols and the duration of a frame is 4* 24 ms=96 ms. Transfers can be made in the frame. Mode II intended for ground-level and satellite transmissions has 384 carriers, a frame has 76 symbols and the duration of a frame is 24 ms. 55,296 MSC bits and 1,024 FIC bits are transferred in a frame. Mode III intended for ground-level, satellite and cable transmissions has 192 carriers, a frame has 153 symbols and the duration of a frame is 24 ms. 55,296 MSC bits and 1,024 FIC bits are transferred in a frame.

The signal received at the transmission end is decoded in a COFDM (Coded Orthogonal Frequency Division Multiplex) block 9 that converts an I-Q signal into a digital mode, the digitized signal is transferred to the frequency level by a fast Fourier transformation, frequency interlacing is removed and the transmission frames are comprised of successive OFDM symbols. The information channel FIC and the channel MSC containing audio and data services are separated from one another and the subchannels are separated from the MSC channel and they are channel decoded in decoders 5' and 6'. The desired subchannels are then conducted to be processed further. The subscriber finds out from the received FIC channel what services the received signal contains and can accordingly select the desired service or services.

One advantage of the DAB system is that data capacity can be reserved dynamically for service providers. For a moment, the capacity can be at most 1,728 Mbit/s. Then data is transmitted in packets, as shown in FIG. 2A, that contain a header field, a data field and a check sum. The meanings of the described fields are in compliance with the DAB standard. The packet header contains information on the length of the packet (PKT LEN) that can be 24, 48, 72 and 96 bytes, a continuity index (CONT IND), the first/last packet information (FIRST/LAST), the address (PKT ADDRESS) identifying the service component, the command, the actual length of the data field (DATA LEN). The data field contains the actual data to be transmitted and stuffing bits when needed. At the end there is a check sum of the packet (PKT CRC).

The data fields of the packets form a so-called Data Group, FIG. 2B. Generally a data group comprises several data fields of packets to be transmitted in sequence. At its simplest, one packet is sufficient for forming one data group.

A data group is comprised as shown in FIG. 3.
The fields of the group header are the following:

| | |
|---|---|
| EXT FL | Extension flag |
| CRC FL | CRC flag |
| SES FL | Session flags |
| DG TYPE | Data group type |
| CONT IND | Continuity index |
| REP IND | Repetition index |
| EXT FIELD | Extension field |

The fields of the session header are the following:

| | |
|---|---|
| LAST FL | Last |
| SEG NUM | Segment number |
| RFA | Reserved |
| LEN IND | indicates the length of the next |

| | |
|---|---|
| ADDR. FIELD | address field<br>End user's address (LEN IND) |

These header fields are followed by the actual data and the check sum of the data group.

At least in theory, the DAB system enables the transmission of multimedia and hypermedia type of services to a mobile user. However, a problem is that in the transmission of multimedia and hypermedia services to a mobile receiver no mechanisms have yet been specified for transmitting service components and files so that the software of the receiver would be able to receive, combine, form, present and execute the services in the way desired by the user in accordance with the possibilities produced by the service provider.

SUMMARY OF THE INVENTION

The object of this invention is to achieve a method and an equipment which will obviate the problem mentioned above.

The object is reached with the method and apparatus according to the appended independent claims.

In accordance with the invention, the service is divided into files at the transmission end. A service ensemble is formed by the mutual parallel and successive presentation of the files in time and spatial domain. A parameter group called a message type is associated with each file. There are four message types:

1) file transfer description,
2) file content description,
3) file presentation description, and
4) file execution description.

At the reception end the user can form, by filtering, a profile of his/her own for the service. A message type associated with each file is utilized in filtering. The profile is such that a definition description can be represented by a flow chart, a matrix, a navigation path or a tree. By means of the profile the receiver is able to receive selectively only the required files or service elements from the service channel. By means of the profile the reception program can present the service formed by the files correctly to the user. As the message types are parameterized, as much interactivity as is desired can be included in the forming stage of the service profile. This interactivity is, however, local between the user and the service channel and not direct between the user and the service provider.

A service profile is formed by searching for elements, classes and objects from the reception channel, by identifying their groups and by searching for the attributes and connections of the groups.

The invention is also characterized in that the service components are timed by applying a time stamp "start", "end" and "duration" to the component. The application is carried out by comparing the time stamp with a reference time scale. A presentation of the components can be in a parallel or serial form.

BRIEF DESCRIPTION OF THE DRAWINGS

The invention will in the following be explained in more detail by means of one preferred embodiment of the invention with reference to the appended diagrammatic figures and tables, in which FIGS. 2A and 2B illustrate the connection between a data group and data packets, FIG. 3 shows the structure of a data group.

DETAILED DESCRIPTION OF THE PREFERRED EMBODIMENT

Figure 1:
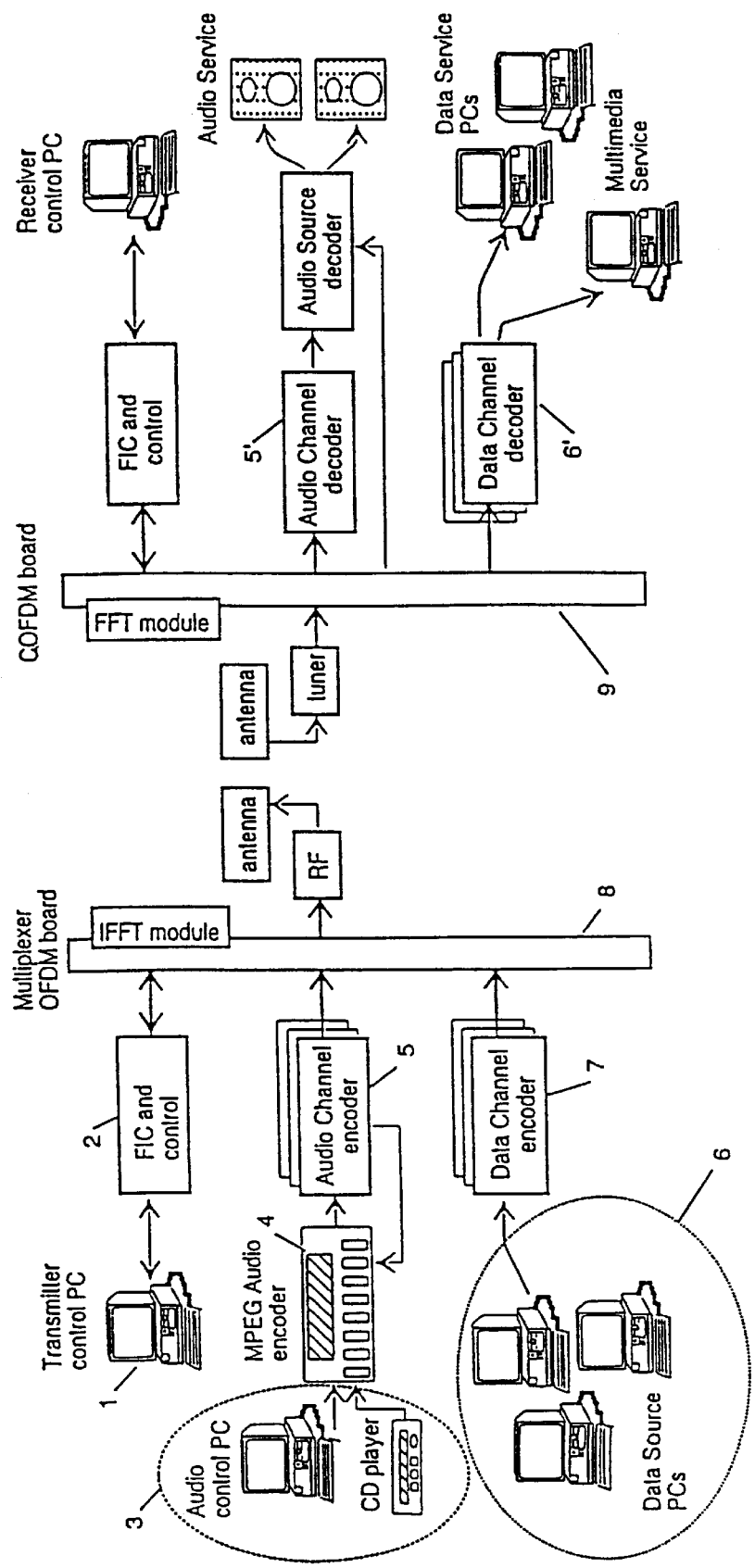
FIG. 1 shows one DAB system.
Figure 4:
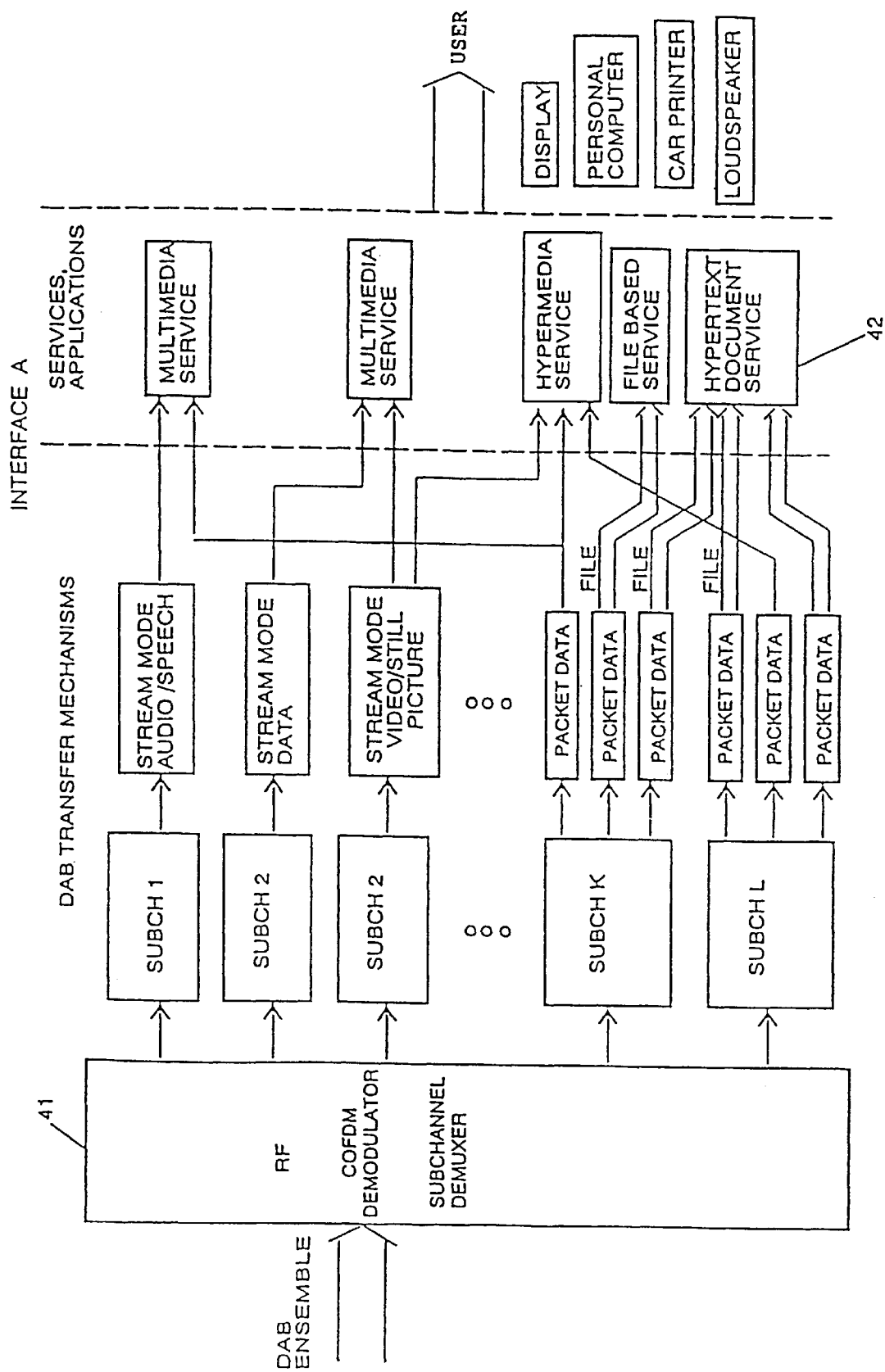
FIG. 4 illustrates a receiver suitable for media applications.

FIG. 4 shows one receiver suitable for media applications. A received ensemble is divided into several services and each service is further divided into service components. A service component is either an audio channel or a data channel. The ensemble is decoded in a COFDM (Coded Orthogonal Frequency Division Multiplex) block 41 and subchannels SUBCH 1, . . . , SUBCHL are separated from the MSC channel in demultiplexing. The desired subchannels are then led to be processed further. Multimedia services, a hypermedia service and a file-based service and a hypertext are formed by combining the service components of the subchannels, such as audio/speech, stream video and packet data in accordance with the application program. The formed services are then carried to the display device of the user or are processed further. Interface A is an interface of the service components after which the application programs form the desired services from the service components.

At the transmission end the service is divided into files. For example, in FIG. 4 a hyper text document service 42 is divided into files. The mutual parallel and successive presentation of the files in time and spatial domain form a service ensemble. A parameter group called a message type is associated with each file. There are four message types: 1) file transfer description, 2) file content description, 3) file presentation description and 4) file execution description. The message types form a file of their own called a description file. It can be transmitted as a file description file or as data group fields by complying to a suitable specific format. A description file is by definition a file that contains the headers of all the files to be transferred via the channel. New data group types are formed for transferring the description file to the receiver, see FIG. 3. Then the connection between the data groups and packets is known and it is as shown in FIGS. 2A and B.

In the receiver shown in FIG. 4, not only the described service component channels, but the information channel FIC and the information channel AIC (not shown in FIG. 4) relating to audio and data services are derived from interface A which is a frame demultiplexed into subchannels. The data groups containing the message types of the service components are also received on this channel.

Figure 5:
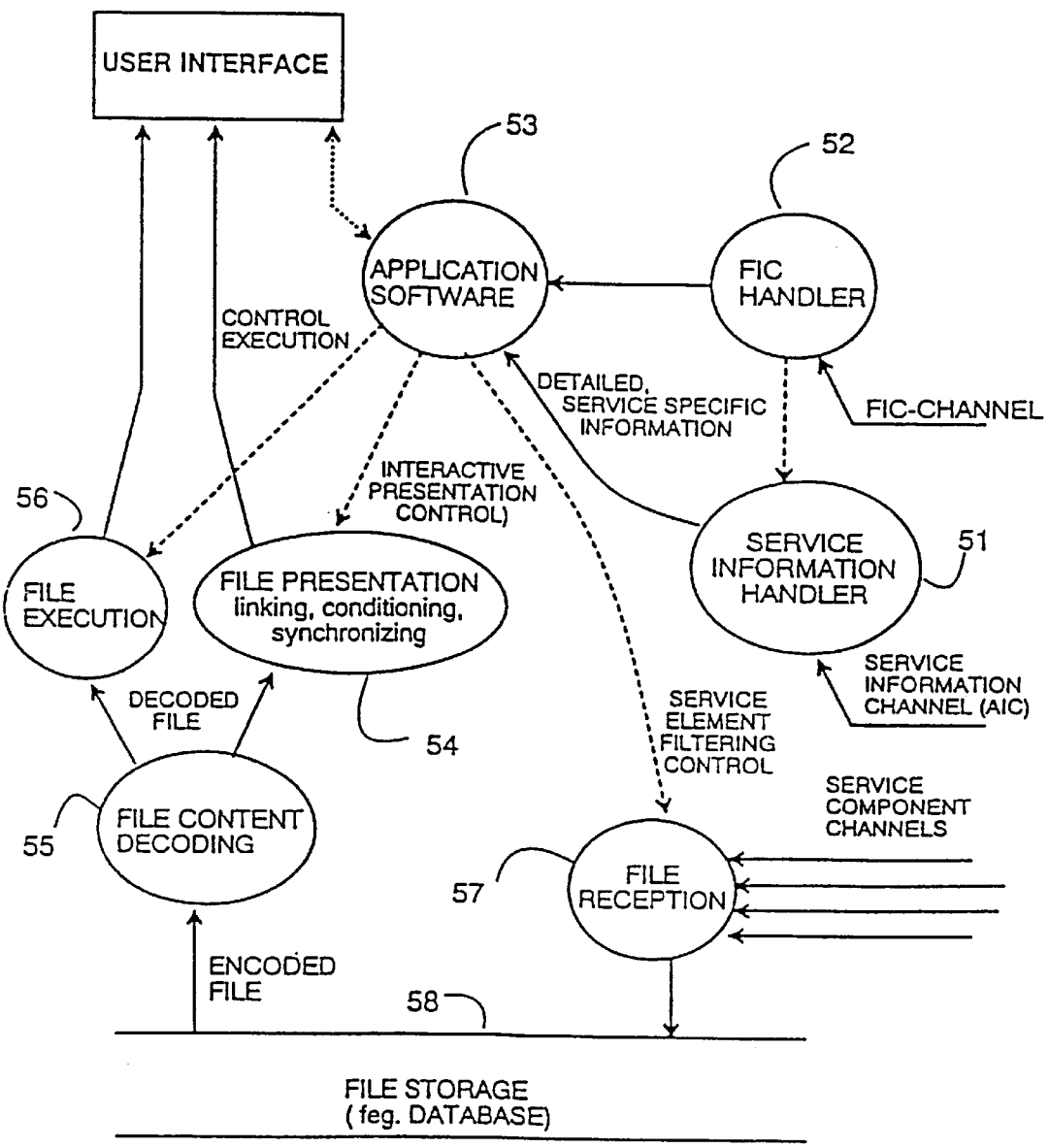
FIG. 5 illustrates the operational arrangement according to the invention in a receiver, Table 1 shows the parameters of a file transfer description, Table 2 shows the parameters of a file content description, Table 3 shows the parameters of a file presentation description, and Table 4 shows the parameters of a file execution description.

A service information handler block 51, an information channel handler block 52 and an application software block 53 are disclosed in FIG. 5 as in the prior art and their operation is known per se. Therefore the block 51 produces service information for the block 53 and the block 53 generates for the user e.g. a graphic user interface from which the user selects the desired service. After this, the application software block assigns to the information channel block 52 the task of separating the desired channels from the subchannels.

In accordance with a preferred embodiment of the invention, the application software block 53 also separates the message types from the information produced by the block 51. In accordance with the file transfer description, the service components of a specified service in encoded form are filtered in a file transfer control block 57 as selected by the user, the files are formed and they are stored into a memory 58. The file encoded from the memory is led to a file content decoding block 55 in which decoding is carried out in the way shown by the "file content description" message type. For example, a picture file is decoded differently from a text file. Decoded files are further processed in a file execution block 56 or in a file presentation block 54.

If a file requires a specific execution, a moving image, for example, the application software block 53 will know from the "file execution description" message type it has received with which program the file will be started in the execution block 56.

If files relate to a multimedia or hypermedia application, the file presentation block 54 handles the linking, synchronizing and other conditions of the files so that the desired result will be reached. The application software block has obtained the necessary instructions from the "file presentation description" message type it has received.

In accordance with FIG. 5, the desired service profile for the user is formed by searching for elements, classes and objects from the received channel, by identifying their groups and by searching for the attributes and connections of the groups. By means of the profile the service is formed from the information content of its components after unpacking their possible way of presentation (decoding, decompressing, etc.). The profile itself is a definition description that can be represented by a flow chart, a matrix, a navigation path or a tree. The profile is dependent on the properties of the receiver. For example, if the receiver cannot decode JPEG pictures, the pictures encoded with them can be omitted from the profile.

The service components are timed by aligning the time stamp of the component (beginning, end, duration) by comparing it with a reference time scale. The component presentation can be in a parallel or serial form.

Recommendation ETS 300075 can be utilized for forming file parameters but other parameter definitions and parameter values are also possible and do not restrict the method according to the present invention.

Table 1 shows some possible parameters of a file transfer description. In addition to these it may also contain other parameters that can be classified into the same category.

Table 2 shows some possible parameters of a file content description. This description may also contain other parameters that can be classified into the same category.

Table 3 hows some possible parameters of a file presentation description. The description may also contain other parameters that can be classified into the same category. This category especially comprises the location of the file in time and spatial domain for the presentation, the conditions triggering the file presentation, that is, dependencies on other presentations, the definitions of the resource channel and the links of the file to other files and media components.

Table 4 shows some possible parameters of a file execution description. The description may also contain other parameters that can be classified into the same category. This is true if the file itself is a file to be executed, but it is also true as an execution instruction for the executing program if the described file is the control file of the program to be executed.

As an example of the use of the invention the transmission of a newspaper should be mentioned. A page of the newspaper is divided into files in the desired manner. Each picture forms a file of its own and the text ensembles or their parts files of their own. The page can also be gridded into blocks that form a file. By using the descriptions according to the invention the pages can be reproduced as complete at the reception end as each file is defined both with respect to its contents and with respect to other files both temporally and locally. In accordance with the profile the receiver creates, he/she can view only the pictures, specified texts, e.g. sports pages.

As the invention especially relates to the new digital audio system DAB, it may be assumed that the production numbers of the system and the equipment will be great. In connection with DAB, the data services and the mechanisms required by them are mostly unspecified. There is therefore a need for transmitting multimedia and hypermedia type of services to a mobile user. Different combinations of picture, voice and data services can be employed in numerous applications. Examples of these services could be a picture index of the yellow pages, petrol station catalogues, passenger information lists and hotel and restaurant directories. Other applications could be newspapers and comics, video announcements, advertisements and entertainment services.

It is to be understood that the specification above and the figures related thereto are only intended to illustrate the present invention. Different variations and modifications of the invention will be obvious to those skilled in the art without deviating from the scope and spirit of the invention disclosed in the appended claims.

Appendix:

1. Tables 1–4

Appendix 1.

TABLE 1

Parameters of the File Contents Descriptor message

| | |
|---|---|
| TRANSFER NAME: | file name during transfer |
| FILE SIZE: | Size of file in segments (Data Groups) |
| | Size of file in bytes |
| SEGMENT SIZE: | Segment size in bytes |
| | Segment size is variable |
| CLOSED USER GROUP ADDRESS: | End user address in Session header |
| CLOSED USER GROUP CHANGE: | Ensemble ID |
| | Service ID |
| | Subchannel ID |
| | Packet address |
| | End user address |
| TRANSFER CHANNEL: | Ensemble D |
| | Service ID |
| | Subchannel ID |
| | Packet address |
| | End user address |
| | Name of the object library |
| | path in the object library |
| | file name |
| | item ID (SCINum) |
| TRANSFER TIMING: | transfer start time |
| | transfer duration |
| | transfer end time |
| | number of repetitions |
| THROUGHPUT CODE: | |
| PRIORITY: | |
| NUMBER OF REMAINING REPETITIONS: | |

TABLE 2

Parameters of the File Contents Descriptor message

| | |
|---|---|
| FILE NAME: | |
| APPLICATION REFERENCE: | |
| FILE DATE: | Date and time yymmddhhmmss |
| FILE LENGTH: | File length in bytes (uncompressed format) |
| AUTHOR NAME: | |
| FILE VERSION NUMBER: | |
| FILE CREATION DATE: | Date and time yymmddhhmmss |
| FILE COST: | |
| FILE TYPE: | Description file |
| | Command file |
| | machine code format |
| | Text file |
| |    ascii with character set tbd |
| | Data file |
| |    binary data |
| | Picture file |
| |    Picture in JPEG format |
| |    Picture in TIFF format |
| | Software file |
| |    source in ascii with character set tbd |
| |    executable in format |
| | Hybrid file |
| |    Item (SCINum) |
| PERMISSION MODE: | dont care/read/write/execute/replace/erase/reserved/insert/extend/hide |
| COMPRESSION MODE: | |
| FILE CODING TYPE: | Basic ASN.1:   ISO 8825 |
| | SGML   ISO 9069 |
| | HTML |
| | other DTD |
| | other Markup Language |
| | Acrobat |
| | Postscrip |
| FILE CHECKSUM: | CRC with 32 bit polynom |

TABLE 3

Parameters of the File Presentation Descriptor message

| | |
|---|---|
| PRESENTATION ATTRIBUTES: | |
| STARTING CONDITION: | List of triggering components |
| | Triggering conditions |
| TIME PRESENTATION OF FILE: (HyTime format) | Time Origin |
| | Date and time yymmddhhmmss |
| | Absolute time |
| |    start (time from origin)/duration/end |
| | Relative time |
| |    delay to start/duration/end |
| TIME PRESENTATION OF ITEM (HyTime format) | Time Origin |
| |    Date and time yymmddhhmmss |
| | Absolute time |
| |    start (time from origin)/duration/end |
| | Relative time |
| |    delay to start/duration/end |
| SPATIAL PRESENTATION OF FILE: | Cartesian coordinates, Polar coordinates |
| SPATIAL PRESENTATION OF ITEM: | Cartesian coordinates, Polar coordinate |
| RESOURCE TYPE: | directory, file, item |
| RESOURCE LOCATION: | Ensemble ID, Service ID, Subchannel ID, Packet address,End user address, Name of the object library, path in the object library, file name, item ID (SCINum), |
| FILE LINKS: | File linking to other files |
| | File linking to other media components |
| OUTPUT DEVICE: | storage |
| | CD-ROM, hard disk, diskette,casette, |
| | memory display |
| |    type, character set, description |
| |    language, font |
| | loudspeaker |
| | printer |

TABLE 3-continued

Parameters of the File Presentation Descriptor message

| | |
|---|---|
| | type, character set, description language, font |

TABLE 4

Parameters of the File Execution Descriptor message

| | |
|---|---|
| EXECUTION ORDER: | priority |
| | repetition number |
| | determined order |
| | performance |
| LOAD ADDRESS: | |
| EXECUTE ABSOLUTE ADDRESS: | |
| EXECUTE RELATIVE ADDRESS: | |

I claim:

1. A method for transferring an audio/video/data service comprising at least one of audio information, video information and data from a transmission end to a reception end over a radio interface comprising a plurality of subchannels and a plurality of carriers for transmitting said audio/video/data service and at least one information channel, said method comprising, at said transmission end:
dividing said audio/video/data service into a set of files, each file of said set of files containing audio/video/data information, wherein said set forms a service ensemble, and associating with each of said files a parameter group for describing each of said files;
placing each of said files onto a corresponding one of said subchannels, placing a corresponding parameter group onto said corresponding one of said subchannels and placing an indication concerning placement of each of said files and said corresponding parameter group onto said at least one information channel;
multiplexing at least said subchannels and said information channel into a plurality of transmission frames which are digitally modulated; and
sending said digitally modulated transmission frames to said reception end over a radio interface using multiple carriers;

said method further comprising, at said reception end:
receiving said multiple carriers, demodulating from said multiple carriers, said plurality of transmission frames and separating, from said transmission frames, at least said subchannels and said at least one information channel;
using information received from said at least one information channel for separating said parameter groups from said subchannels; and
using said parameter groups for forming a selective service by combining and processing substantially only desired ones of said files, whereby ones of said files not needed for selective service will not be further processed.

2. A method according to claim 1, wherein each of said parameter groups comprises a file transfer description comprising a first plurality of parameters which indicate at least a size information of said associated file, individualizing information of a transmission channel and timing information of a transmission.

3. A method according to claim 2, wherein each of said parameter groups comprises a file content description comprising a second plurality of parameters which indicate at least a file type of said associated file and a format of said associated file.

4. A method according to claim 3, wherein said file type is selected from a group comprising: a command file, a text file, a data file, a picture file, a program file, a hybrid file, and a script file.

5. A method according to claim 1, wherein each of said parameter groups comprises a file content description comprising a second plurality of parameters which indicate at least a file type of said associated file and a format of said associated file.

6. A method according to claim 5, wherein said file type is selected from a group comprising: a command file, a text file, a data file, a picture file, a program file, a hybrid file, and a script file.

7. A method according to claim 1, wherein each of said parameter groups comprises a file presentation description comprising a plurality of parameters indicating for a presentation of said associated file at least a location of said associated file in time and spatial domain, conditions triggering said presentation of said associated file and a plurality of links to other files and a description of at least one presentation device.

8. A method according to claim 1, wherein each of said parameter groups comprises a file execution description comprising a plurality of parameters which indicate at least an execution command and condition statements if said associated file is a file to be executed and an execution instruction if said associated file is a control file of a program to be executed.

9. A method according to claim 1, wherein in the reception end said parameter groups are used for providing a user with an indication of available services and said using said parameter groups for forming said selective service is responsive to a selection input from said user.

10. A method according to claim 1, wherein said sending step comprises broadcasting said transmission frames to a plurality of reception ends simultaneously, and at each of said reception ends, said using said parameter groups for forming said selective service is carried out for providing an individual service from said transmission frames common to said reception ends.

11. An apparatus for transmitting an audio/video/data service over a radio interface, said radio interface comprising a plurality of subchannels and a plurality of carriers for transmitting said audio/video/data service and at least one information channel, said apparatus comprising:

file and descriptor creating means for dividing said audio/video/data service into a set of files, wherein each of said files comprises audio/video/data information and said set forms a service ensemble, and for associating, with each of said files, a parameter group for describing a corresponding one of said files;

multiplexing means for placing each file onto one of said subchannels, for placing a corresponding parameter group onto said one of said subchannels, for placing an indication concerning placement of said corresponding one of said files and said corresponding parameter group onto said at least one information channel, and for multiplexing at least said subchannels and said at least one information channel into a plurality of transmission frames which are digitally modulated; and sending means for sending said digitally modulated transmission frames to at least one reception end over a radio interface using said plurality of carriers.

12. An apparatus for receiving an audio/video/data service over a radio interface, said radio interface comprising a plurality of subchannels and a plurality of carriers for transmitting said audio/video/data service and at least one information channel, said apparatus comprising:

receiving means for receiving said plurality of carriers, for demodulating, from said carriers, a plurality of transmission frames, and for separating, from said transmission frames, at least said subchannels and said at least one information channel;

separating means for separating a plurality of parameter groups from said subchannels based on information received from said at least one information channel; and service forming means for forming a service by selectively combining and processing, based on parameter groups, substantially only desired files, whereby files not needed for said service will not be further processed.

* * * * *